United States Patent
Yan

(10) Patent No.: US 11,307,639 B2
(45) Date of Patent: Apr. 19, 2022

(54) POWER CONSUMPTION CONTROL METHOD AND SYSTEM FOR ELECTRONIC POSITIONING DEVICE, AND ELECTRONIC POSITIONING DEVICE

(71) Applicant: CHENGDU JAALEE TECHNOLOGY CO., LTD., Sichuan (CN)

(72) Inventor: Zhiyuan Yan, Sichuan (CN)

(73) Assignee: CHENGDU JAALEE TECHNOLOGY CO., LTD., Sichuan (CN)

(*) Notice: Subject to any disclaimer, the term of this patent is extended or adjusted under 35 U.S.C. 154(b) by 180 days.

(21) Appl. No.: 16/631,962

(22) PCT Filed: Dec. 22, 2017

(86) PCT No.: PCT/CN2017/117953
§ 371 (c)(1),
(2) Date: Mar. 6, 2020

(87) PCT Pub. No.: WO2019/015252
PCT Pub. Date: Jan. 24, 2019

(65) Prior Publication Data
US 2020/0226075 A1 Jul. 16, 2020

(30) Foreign Application Priority Data
Jul. 18, 2017 (CN) .......................... 201710586498.8

(51) Int. Cl.
*G06F 1/3287* (2019.01)
*G06F 1/26* (2006.01)
(Continued)

(52) U.S. Cl.
CPC ......... *G06F 1/3287* (2013.01); *G01C 21/165* (2013.01); *G01S 19/34* (2013.01);
(Continued)

(58) Field of Classification Search
CPC ...... Y02D 10/00; G01S 19/34; G01C 21/165; H04W 4/38; H04W 52/0225;
(Continued)

(56) References Cited

U.S. PATENT DOCUMENTS

2004/0203879 A1* 10/2004 Gardner ............... G01S 19/34
455/456.1
2009/0163226 A1* 6/2009 Karkaria ............. H04W 52/028
455/456.1
(Continued)

FOREIGN PATENT DOCUMENTS

CN 201259540 Y * 6/2009
CN 104768127 A 7/2015
(Continued)

OTHER PUBLICATIONS

EPO Machine translation of CN201259540Y (Year: 2009).*
Translation of International Search Report cited in Chinese Appln. No. PCT/CN2017/117953 dated Apr. 3, 2018.

*Primary Examiner* — Glenn A. Auve
(74) *Attorney, Agent, or Firm* — Bacon & Thomas, PLLC

(57) ABSTRACT

This application discloses a power consumption control method and system for an electronic positioning device, and an electronic positioning device. The method includes: obtaining sensing data of a sensor for sensing a physical quantity of an object's state of motion (101); determining, based on the sensing data, whether a current condition meets a preset trigger condition, to obtain a first determining result (102); sending a first control instruction when the first determining result indicates that the current condition meets the preset trigger condition (103), where the first control instruction is used to enable a positioning module in the electronic positioning device such that the positioning module is in an on state; and maintaining the positioning module in an off state when the first determining result indicates that (Continued)

the current condition does not meet the preset trigger condition (104).

17 Claims, 6 Drawing Sheets

(51) Int. Cl.
  G06F 13/10 (2006.01)
  G01S 19/34 (2010.01)
  G01C 21/16 (2006.01)
  H04W 4/38 (2018.01)
(52) U.S. Cl.
  CPC ............. G06F 1/26 (2013.01); G06F 13/10 (2013.01); H04W 4/38 (2018.02); *G06F 2213/40* (2013.01)
(58) Field of Classification Search
  CPC .......... H04W 52/0229; H04W 52/0209; G06F 13/10; G06F 1/26; G06F 1/3287; G06F 1/3278; G06F 2213/40
  See application file for complete search history.

(56) References Cited

U.S. PATENT DOCUMENTS

| | | | |
|---|---|---|---|
| 2009/0248303 A1* | 10/2009 | Tai | G01C 21/00 701/490 |
| 2012/0147531 A1* | 6/2012 | Rabii | H04W 52/0254 361/679.01 |
| 2015/0198996 A1* | 7/2015 | Kliegman | G06F 1/3206 713/324 |
| 2016/0169692 A1* | 6/2016 | Gupta | G01C 21/3469 701/521 |
| 2017/0060226 A1* | 3/2017 | Erad | G06F 1/263 |
| 2017/0171712 A1* | 6/2017 | Luo | H04W 4/029 |
| 2018/0167887 A1* | 6/2018 | Dai | H04W 4/02 |
| 2018/0239040 A1* | 8/2018 | Adams | G01V 1/22 |
| 2018/0356534 A1* | 12/2018 | Sugiyama | G01C 21/165 |

FOREIGN PATENT DOCUMENTS

| | | |
|---|---|---|
| CN | 105353389 A | 2/2016 |
| CN | 105872241 A | 8/2016 |
| JP | 2009267886 A | 11/2009 |

\* cited by examiner

POWER CONSUMPTION CONTROL METHOD AND SYSTEM FOR ELECTRONIC POSITIONING DEVICE, AND ELECTRONIC POSITIONING DEVICE

This application claims priority to Chinese Patent Application No. 201710586498.8, filed with the Chinese Patent Office on Jul. 18, 2017 and entitled "POWER CONSUMPTION CONTROL METHOD AND SYSTEM FOR ELECTRONIC POSITIONING DEVICE, AND ELECTRONIC POSITIONING DEVICE", which is incorporated herein by reference in its entirety.

TECHNICAL FIELD

This application relates to the power consumption control field, and in particular, to a power consumption control method and system for an electronic positioning device, and an electronic positioning device.

BACKGROUND

An electronic positioning device is a terminal device for obtaining position information. The terminal device can obtain geographical position information of the terminal through a Global Positioning System (GPS), a wireless network, or base station-assisted positioning. After obtaining the geographical position information, the terminal device can transmit position data to user equipment such as a smartphone through a network. A user of the user equipment such as the smartphone can view the geographical position information of the electronic positioning device.

In the prior art, the electronic positioning device mainly performs positioning based on time information. A positioning module is used to perform positioning at a predetermined moment, and a data transmission module is used to transmit positioning data. However, due to high power of the positioning module and the data transmission module, a standby time of the electronic positioning device in the prior art is usually only 2 to 3 days, and one week at most.

The standby time is a major aspect of evaluating performance of the electronic positioning device. For example, if a standby time of an electronic positioning device disposed on a vehicle for anti-theft is less than one week, a thief may place the stolen vehicle in a signal shielding area for one week after stealing the vehicle, and sell the stolen vehicle to a buyer after power of the electronic positioning device is exhausted. This is because the standby time of the electronic positioning device is short, and the power of the electronic positioning device can be exhausted when the theft stores the stolen vehicle for a short period of time, thereby deactivating the electronic positioning device. Therefore, the standby time of the electronic positioning device significantly affects an application range of the electronic positioning device.

SUMMARY

This application provides a power consumption control method and system for an electronic positioning device, and an electronic positioning device, to greatly prolong a standby time of the electronic positioning device.

To achieve the above purpose, the present invention provides the following technical solutions.

A power consumption control method for an electronic positioning device includes:

obtaining sensing data of a sensor for sensing a physical quantity of an object's state of motion;

determining, based on the sensing data, whether a current condition meets a preset trigger condition, to obtain a first determining result;

sending a first control instruction when the first determining result indicates that the current condition meets the preset trigger condition, wherein the first control instruction is used to enable a positioning module in the electronic positioning device such that the positioning module is in an on state; and maintaining the positioning module in an off state when the first determining result indicates that the current condition does not meet the preset trigger condition.

Optionally, the obtaining sensing data of a sensor for sensing a physical quantity of an object's state of motion specifically includes:

obtaining acceleration data sensed by an acceleration sensor.

Optionally, the determining, based on the sensing data, whether a current condition meets a preset trigger condition specifically includes:

determining, based on the sensing data, whether duration in which the electronic positioning device is in a static state is greater than or equal to first preset duration.

Optionally, the determining, based on the sensing data, whether a current condition meets a preset trigger condition specifically includes:

determining, based on the sensing data, whether duration in which the electronic positioning device is in a static state is greater than or equal to second preset duration, and switching from the static state to a moving state after the second preset duration.

Optionally, the determining, based on the sensing data, whether a current condition meets a preset trigger condition specifically includes:

determining, based on the sensing data, whether duration in which the electronic positioning device is in a moving state is greater than or equal to third preset duration.

Optionally, the determining whether duration in which the electronic positioning device is in a moving state is greater than or equal to third preset duration specifically includes:

determining whether acceleration of the electronic positioning device is a non-zero value and whether duration in which the acceleration of the electronic positioning device is in a linear change state is greater than or equal to the third preset duration.

Optionally, the determining, based on the sensing data, whether a current condition meets a preset trigger condition specifically includes:

determining, based on the acceleration data, whether duration in which the electronic positioning device is in a moving state from a first moment is greater than or equal to fourth preset duration, to obtain a second determining result;

when the second determining result is yes, determining an end moment of the moving state of the electronic positioning device; and determining whether duration in which the electronic positioning device is in a static state from the end moment is greater than or equal to fifth preset duration.

Optionally, the determining, based on the sensing data, whether a current condition meets a preset trigger condition specifically includes:

determining, based on the acceleration data, whether a moving distance of the electronic positioning device is greater than or equal to a preset distance.

Optionally, the determining whether a moving distance of the electronic positioning device is greater than or equal to a preset distance specifically includes:

determining whether a quantity of pulses sensed by the acceleration sensor is greater than or equal to a first preset threshold.

Optionally, the determining, based on the sensing data, whether a current condition meets a preset trigger condition specifically includes:

determining, based on the acceleration data, whether the electronic positioning device completes an acceleration process and a corresponding deceleration process, to obtain a third determining result;

increasing a count value by 1 when the third determining result is yes, wherein an initial value of the count value is 0; and determining whether the count value is greater than a second preset threshold.

Optionally, after the sending a first control instruction, the method further includes:

obtaining position information output by the positioning module;

determining whether a position offset between the position information and position information output by the positioning module last time is greater than or equal to a preset position offset, to obtain a fourth determining result;

sending a second control instruction when the fourth determining result indicates that the position offset is greater than or equal to the preset position offset, wherein the second control instruction is used to enable a positioning data sending module in the electronic positioning device such that the positioning data sending module is in an on state; and maintaining the positioning data sending module in an off state when the fourth determining result indicates that the position offset is less than the preset position offset.

Optionally, before the sending a first control instruction, the method further includes:

obtaining information about a peripheral device that maintains a BLUETOOTH® connection with the electronic positioning device;

determining, based on the peripheral device information, whether the electronic positioning device is in a BLUETOOTH® connection with a target peripheral device having a positioning module, to obtain a fifth determining result;

when the fifth determining result indicates that the electronic positioning device is in the BLUETOOTH® connection with the target peripheral device having the positioning module, sending a positioning request to the target peripheral device, and skipping sending the first control instruction, wherein the positioning request is used to request the target peripheral device to perform positioning through the positioning module in the target peripheral device; and sending the first control instruction when the fifth determining result indicates that the electronic positioning device is not in the BLUETOOTH® connection with the target peripheral device having the positioning module.

An electronic positioning device includes a positioning module, a controller, and a sensor for sensing a physical quantity of an object's state of motion, where the controller stores a program and is configured to perform the following steps:

obtaining sensing data of the sensor;

determining, based on the sensing data, whether a current condition meets a preset trigger condition, to obtain a first determining result;

sending a first control instruction when the first determining result indicates that the current condition meets the preset trigger condition, wherein the first control instruction is used to enable a positioning module in the electronic positioning device such that the positioning module is in an on state; and maintaining the positioning module in an off state when the first determining result indicates that the current condition does not meet the preset trigger condition.

Optionally, the determining, based on the sensing data, whether a current condition meets a preset trigger condition specifically includes:

determining, based on the sensing data, whether duration in which the electronic positioning device is in a static state is greater than or equal to first preset duration.

Optionally, after the sending a first control instruction, the following steps are further performed:

obtaining position information output by the positioning module;

determining whether a position offset between the position information and position information output by the positioning module last time is greater than or equal to a preset position offset, to obtain a second determining result;

sending a second control instruction when the second determining result indicates that the position offset is greater than or equal to the preset position offset, wherein the second control instruction is used to enable a positioning data sending module in the electronic positioning device such that the positioning data sending module is in an on state; and maintaining the positioning data sending module in an off state when the second determining result indicates that the position offset is less than the preset position offset.

Optionally, before the sending a first control instruction, the following steps are further performed:

obtaining information about a peripheral device that maintains a BLUETOOTH® connection with the electronic positioning device;

determining, based on the peripheral device information, whether the electronic positioning device is in a BLUETOOTH® connection with a target peripheral device having a positioning module, to obtain a third determining result;

when the third determining result indicates that the electronic positioning device is in the BLUETOOTH® connection with the target peripheral device having the positioning module, sending a positioning request to the target peripheral device, and skipping sending the first control instruction, wherein the positioning request is used to request the target peripheral device to perform positioning through the positioning module in the target peripheral device; and sending the first control instruction when the third determining result indicates that the electronic positioning device is not in the BLUETOOTH® connection with the target peripheral device having the positioning module.

A power consumption control system for an electronic positioning device includes:

an obtaining unit, configured to obtain sensing data of a sensor for sensing a physical quantity of an object's state of motion;

a first determining unit, configured to determine, based on the sensing data, whether a current condition meets a preset trigger condition, to obtain a first determining result;

a first control instruction sending unit, configured to send a first control instruction when the first determining result indicates that the current condition meets the preset trigger condition, wherein the first control instruction is used to enable a positioning module in the electronic positioning device such that the positioning module is in an on state; and a first off-state maintaining unit, configured to maintain the positioning module in an off state when the first determining result indicates that the current condition does not meet the preset trigger condition.

Optionally, the first determining unit specifically includes:

a first determining subunit, configured to determine, based on the sensing data, whether duration in which the electronic positioning device is in a static state is greater than or equal to first preset duration.

Optionally, the system further includes:

a position information obtaining unit, configured to: after the first control instruction is sent, obtain position information output by the positioning module;

a second determining unit, configured to determine whether a position offset between the position information and position information output by the positioning module last time is greater than or equal to a preset position offset, to obtain a second determining result;

a second control instruction sending unit, configured to send a second control instruction when the second determining result indicates that the position offset is greater than or equal to the preset position offset, wherein the second control instruction is used to enable a positioning data sending module in the electronic positioning device such that the positioning data sending module is in an on state; and a second off-state maintaining unit, configured to maintain the positioning data sending module in an off state when the second determining result indicates that the position offset is less than the preset position offset.

Optionally, the system further includes:

a peripheral device information obtaining unit, configured to: before the first control instruction is sent, obtain information about a peripheral device that maintains a BLUETOOTH® connection with the electronic positioning device;

a third determining unit, configured to determine, based on the peripheral device information, whether the electronic positioning device is in a BLUETOOTH® connection with a target peripheral device having a positioning module, to obtain a third determining result; and a positioning request sending unit, configured to: when the third determining result indicates that the electronic positioning device is in the BLUETOOTH® connection with the target peripheral device having the positioning module, send a positioning request to the target peripheral device, and skip sending the first control instruction, wherein the positioning request is used to request the target peripheral device to perform positioning through the positioning module in the target peripheral device, wherein the first control instruction sending unit is specifically configured to send the first control instruction when the third determining result indicates that the electronic positioning device is not in the BLUETOOTH® connection with the target peripheral device having the positioning module.

According to specific embodiments provided in this application, this application discloses the following technical effects:

Sensing data of a sensor for sensing a physical quantity of an object's state of motion is obtained; it is determined, based on the sensing data, whether a current condition meets a preset trigger condition, and a first control instruction is sent when the current condition meets the preset trigger condition, where the first control instruction is used to enable a positioning module in the electronic positioning device such that the positioning module is in an on state; and the positioning module is maintained in an off state when a first determining result indicates that the current condition does not meet the preset trigger condition. According to the power consumption control method and system for the electronic positioning device in this application, the positioning module can always be maintained in the off state when the preset trigger condition is not met, and the positioning module in the electronic positioning device is enabled only when the preset trigger condition is met. In this way, power consumption of the electronic positioning device can be reduced, thereby greatly prolonging a standby time of the electronic positioning device.

BRIEF DESCRIPTION OF THE DRAWINGS

To describe the technical solutions in the embodiments of this application or in the prior art more clearly, the following briefly describes the accompanying drawings required for the embodiments. Apparently, the accompanying drawings in the following description show merely some embodiments of this application, and a person of ordinary skill in the art may still derive other accompanying drawings from these accompanying drawings without creative efforts.

DETAILED DESCRIPTION

The technical solutions of the embodiments of this application are clearly and completely described below with reference to the accompanying drawings of the embodiments of this application. Apparently, the described embodiments are some rather than all of the embodiments of this application. All other embodiments obtained by those of ordinary skill in the art based on the embodiments of this application without creative efforts shall fall within the protection scope of this application.

To make the above objects, features, and advantages of this application more obvious and easy to understand, this application will be further described in detail with reference to the accompanying drawings and the detailed description.

Figure 1:
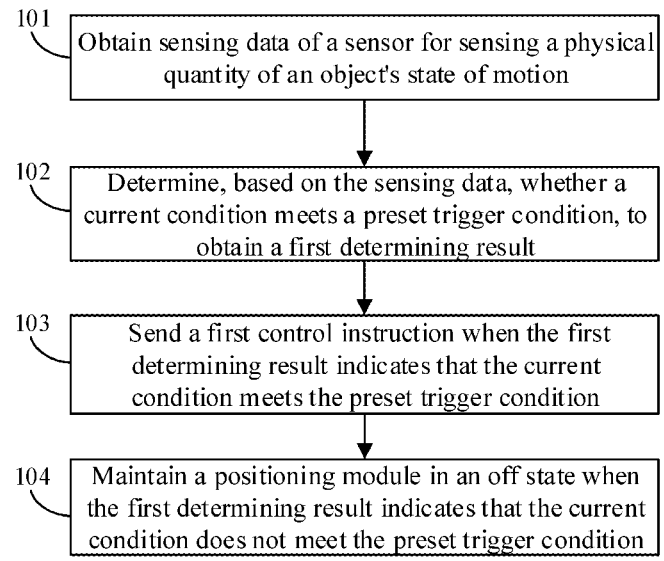
FIG. 1 is a flowchart of Embodiment 1 of a power consumption control method for an electronic positioning device according to this application.

FIG. 1 is a flowchart of Embodiment 1 of a power consumption control method for an electronic positioning device according to this application. As shown in FIG. 1, the method may include the following steps.

Step 101: Obtain sensing data of a sensor for sensing a physical quantity of an object's state of motion.

The sensor may be an acceleration sensor, a gyroscope, a magnetometer, or the like. This step may be performed by a controller such as a BLUETOOTH® Controller (BC). A working current of the BLUETOOTH® controller is usually several tens of microamps, and power consumption is very low in comparison with a working current of several milliamps of a positioning module.

The controller in this application may be alternatively a Micro Controller Unit (MCU), a System on Chip (SoC), or an Advanced RIS Microprocessor (ARM).

Step 102: Determine, based on the sensing data, whether a current condition meets a preset trigger condition, to obtain a first determining result.

The preset trigger condition corresponds to the sensing data. When the sensing data is acceleration data, the preset trigger condition may be a condition related to acceleration of the electronic positioning device. When the sensing data is an angular velocity, the preset trigger condition may be a condition related to an angular velocity of the electronic positioning device.

Step 103: Send a first control instruction when the first determining result indicates that the current condition meets the preset trigger condition, where the first control instruction is used to enable a positioning module in the electronic positioning device such that the positioning module is in an on state.

An on/off state of the positioning module in the electronic positioning device in this application is controlled by the controller. For example, a switch or a module with a switching function may be disposed between the controller and the positioning module. Alternatively, the positioning module includes an enabling terminal with a switching function, and a control end of the controller is connected to the enabling terminal. The first control instruction may be correspondingly sent to the switch, the module with the switching function, or the enabling terminal.

Step 104: Maintain the positioning module in an off state when the first determining result indicates that the current condition does not meet the preset trigger condition.

When the current condition does not meet the preset trigger condition, if the positioning module is originally in the off state, a trigger operation for the positioning module may no longer be performed.

In this embodiment, sensing data of a sensor for sensing a physical quantity of an object's state of motion is obtained; it is determined, based on the sensing data, whether a current condition meets a preset trigger condition, and a first control instruction is sent when the current condition meets the preset trigger condition, where the first control instruction is used to enable a positioning module in the electronic positioning device such that the positioning module is in an on state; and the positioning module is maintained in an off state when a first determining result indicates that the current condition does not meet the preset trigger condition. According to the power consumption control method and system for the electronic positioning device in this application, the positioning module can always be maintained in the off state when the preset trigger condition is not met, and the positioning module in the electronic positioning device is enabled only when the preset trigger condition is met. Therefore, a standby time of the electronic positioning device can be greatly prolonged.

Figure 2:
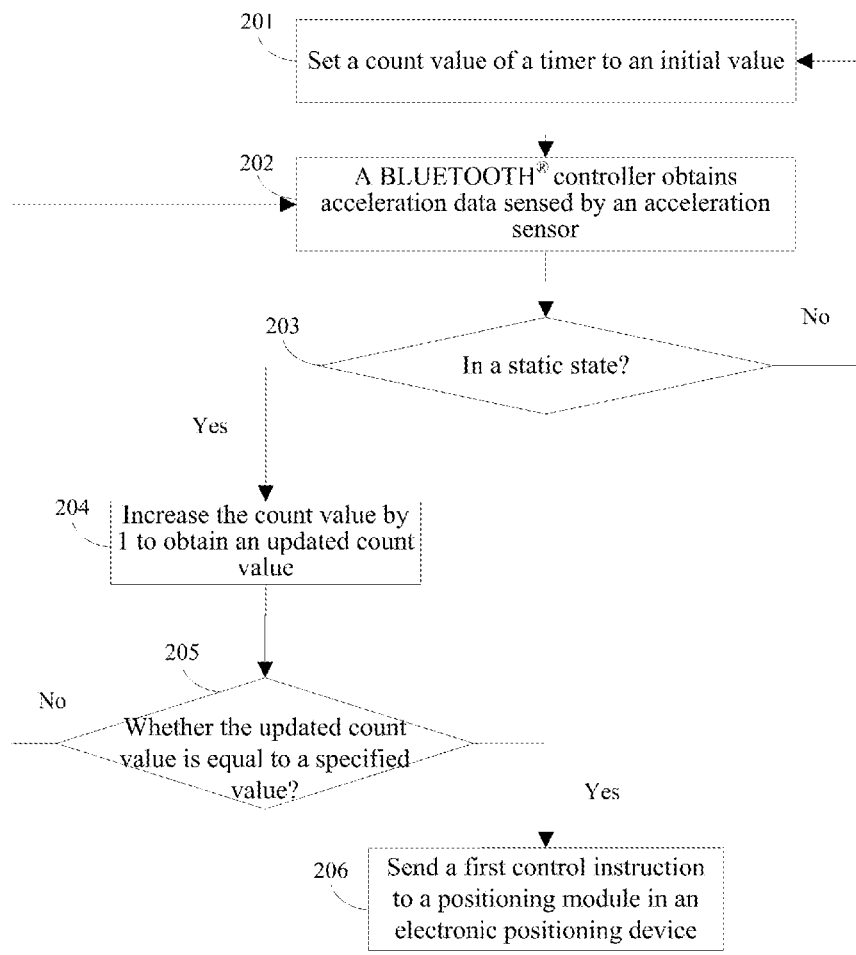
FIG. 2 is a flowchart of Embodiment 2 of a power consumption control method for an electronic positioning device according to this application.

FIG. 2 is a flowchart of Embodiment 2 of a power consumption control method for an electronic positioning device according to this application. As shown in FIG. 2, the method may include the following steps.

Step 201: Set a count value of a timer to an initial value.

The count value may be an integer. The initial value may be set to 0 or other integers.

Step 202: A BLUETOOTH® controller obtains acceleration data sensed by an acceleration sensor.

The BLUETOOTH® controller may be a chip with low power consumption and a control function. The acceleration sensor may be in a working state for a long time, and acceleration information of the electronic positioning device is sensed in real time to generate the acceleration data.

Step 203: Determine, based on the acceleration data, whether the electronic positioning device is in a static state, and if yes, perform step 204; otherwise, go back to step 201.

When a value of the acceleration data is zero, it may be determined that the electronic positioning device is in the static state. It should be noted that, the sensor may have a minor error in actual application. Therefore, when it is determined, based on the acceleration data, whether the electronic positioning device is the static state, the minor error is allowed for a determining criterion of the value of the acceleration data. For example, the determining criterion may be set to ±0.01 m/s2. When the value of the acceleration data is within a range of the determining criterion, it may be determined that the electronic positioning device is in the static state. It should be further noted that in this specification, the minor error is allowed in all determining steps involving numerical comparison, and details are not described in the following embodiments.

Step 204: Increase the count value by 1 to obtain an updated count value.

Step 205: Determine whether the updated count value is equal to a specified value, and if yes, perform step 206; otherwise, go back to step 202.

The specified value may be set based on a time length. If it takes one second to perform steps 202 to 205 once, and a positioning module needs to be triggered after waiting for one minute, the specified value may be set to 60.

Step 206: Send a first control instruction to the positioning module in the electronic positioning device.

In this embodiment, the positioning module is triggered to perform positioning only when duration in which the electronic positioning device is in the static state reaches preset duration, thereby reducing power consumption of the electronic positioning device. For example, in a specific application scenario, after a user places a wallet carrying the electronic positioning device at a specified position, the positioning module is triggered after the electronic positioning device is in the static state for 20 minutes. In the foregoing scenario, an article such as the wallet of the user may be located when the article is out of a portable range of the user and is placed for a long time. Efficiency of this positioning manner is high. If a real-time positioning manner is adopted, when the user carries the article, because the article always follows the user's movement, the position is constantly updated, and a positioning operation is constantly triggered, resulting in high power consumption. In addition, position information is obtained through positioning when the article is in the static state, making it easier for the user to find the object based on the position information.

Figure 3:
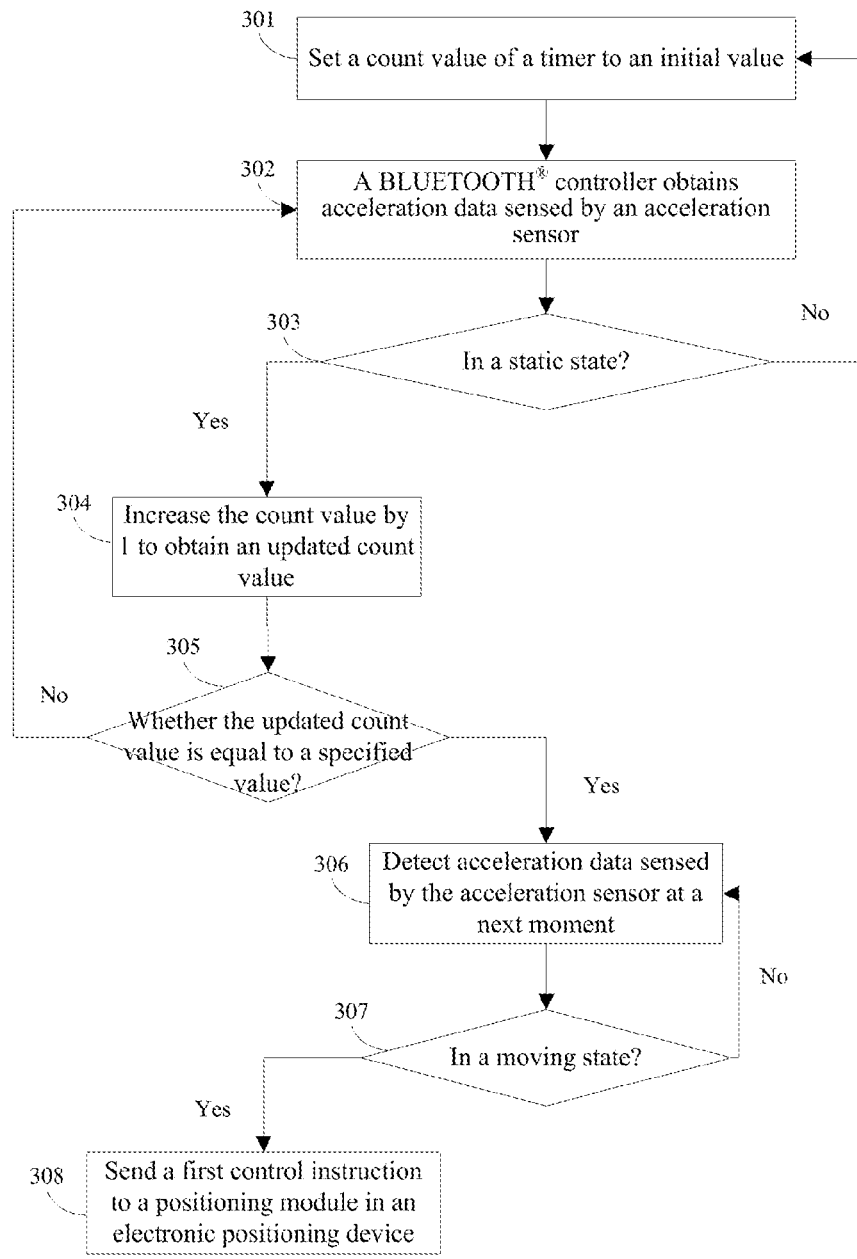
FIG. 3 is a flowchart of Embodiment 3 of a power consumption control method for an electronic positioning device according to this application.

FIG. 3 is a flowchart of Embodiment 3 of a power consumption control method for an electronic positioning device according to this application. As shown in FIG. 3, the method may include the following steps.

Step 301: Set a count value of a timer to an initial value.

Step 302: A BLUETOOTH® controller obtains acceleration data sensed by an acceleration sensor.

Step 303: Determine, based on the acceleration data, whether the electronic positioning device is in a static state, and if yes, perform step 304; otherwise, go back to step 301.

Step 304: Increase the count value by 1 to obtain an updated count value.

Step 305: Determine whether the updated count value is equal to a specified value, and if yes, perform step 306; otherwise, go back to step 302.

Step 306: Detect acceleration data sensed by the acceleration sensor at a next moment.

Step 307: Determine, based on the detected acceleration data, whether the electronic positioning device is in a moving state, and if yes, perform step 308; otherwise, go back to step 306.

When a value of the acceleration data is not zero, it may be determined that the electronic positioning device is in the moving state. It should be noted that, the sensor may have a minor error in actual application. Therefore, when it is determined, based on the acceleration data, whether the electronic positioning device is the moving state, the minor error is allowed for a determining criterion of the value of the acceleration data. For example, the determining criterion may be set to ±0.01 m/s2. When the value of the acceleration data is not within a range of the determining criterion, it may be determined that the electronic positioning device is in the moving state.

Step 308: Send a first control instruction to a positioning module in the electronic positioning device.

In this embodiment, the electronic positioning device may be set to a motion detection state after duration in which the electronic positioning device is in the static state reaches preset duration. The positioning module is triggered to perform positioning only when it is detected that the electronic positioning device switches from the static state to the moving state, thereby reducing power consumption of the electronic positioning device. For example, in a specific application scenario, after a user places the electronic positioning device in a safe, the electronic positioning device enters the motion detection state after being in the static state for 20 minutes. When a person moves the safe, the electronic positioning device is triggered to perform positioning. In the foregoing scenario, a moving state of a specific object can be detected. Subsequently, when it is detected that the electronic positioning device switches from the static state to the moving state, the electronic positioning device may send an alarm signal to implement an anti-theft function. The alarm signal may be sent to a server or a terminal that is in a communication connection with the electronic positioning device.

Figure 4:
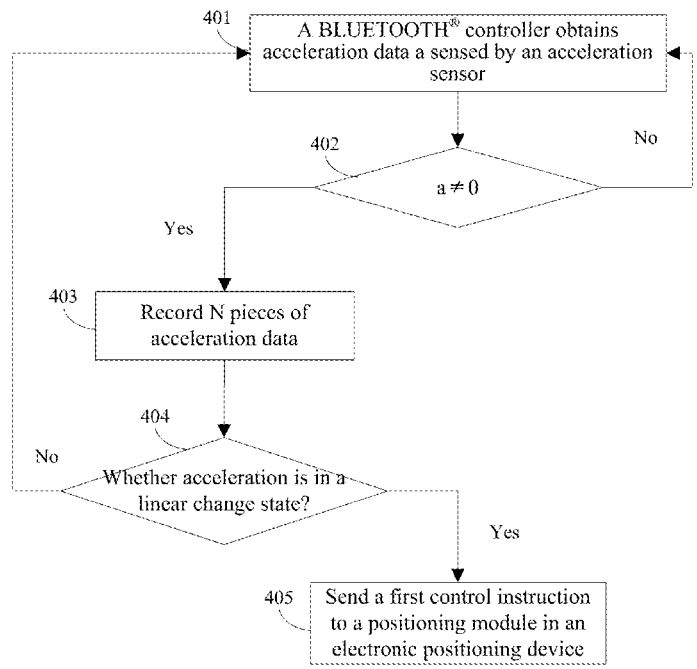
FIG. 4 is a flowchart of Embodiment 4 of a power consumption control method for an electronic positioning device according to this application.

FIG. 4 is a flowchart of Embodiment 4 of a power consumption control method for an electronic positioning device according to this application. As shown in FIG. 4, the method may include the following steps.

Step 401: A BLUETOOTH® controller obtains acceleration data a sensed by an acceleration sensor.

Step 402: Determine whether a is a non-zero value, and if yes, perform step 403; otherwise, go back to step 401.

In this step, when a is a non-zero value, it is determined that the electronic positioning device is in a moving state.

Step 403: When acceleration data subsequently sensed by the acceleration sensor is a non-zero value, record acceleration data sensed by the acceleration sensor each time until N pieces of acceleration data are recorded.

A value of N may be set as required. For example, it is assumed that it takes 0.5 seconds to record one piece of acceleration data in step 403. If a moving state of the electronic positioning device within 3 seconds needs to be analyzed, the value of N may be set to 6.

Step 404: Determine whether acceleration of the electronic positioning device is in a linear change state based on the N pieces of acceleration data, and if yes, perform step 405; otherwise, go back to step 401.

That the acceleration of the electronic positioning device is in the linear change state at least includes: acceleration data at consecutive equal time intervals constitutes an arithmetic sequence. For example, the acceleration is 1 in a 1st second, the acceleration is 2 in a 2nd second, and the acceleration is 3 in a 3rd second; or the acceleration is 1 in a 1st second, the acceleration is 1 in a 2nd second, and the acceleration is 1 in a 3rd second.

Specifically, after the N pieces of acceleration data sensed by the acceleration sensor are obtained, a difference between each two adjacent acceleration values may be calculated. If the difference between each two adjacent acceleration values is equal or a deviation of the difference between each two adjacent acceleration values is within a preset range, it may be determined that the acceleration of the electronic positioning device is in the linear change state.

Step 405: Send a first control instruction to a positioning module in the electronic positioning device.

In this embodiment, it may be determined whether the acceleration of the electronic positioning device is a non-zero value and whether duration in which the acceleration of the electronic positioning device is in the linear change state is greater than or equal to preset duration. The positioning module is triggered to perform positioning when a determining result is yes, thereby reducing power consumption of the electronic positioning device.

Figure 5:
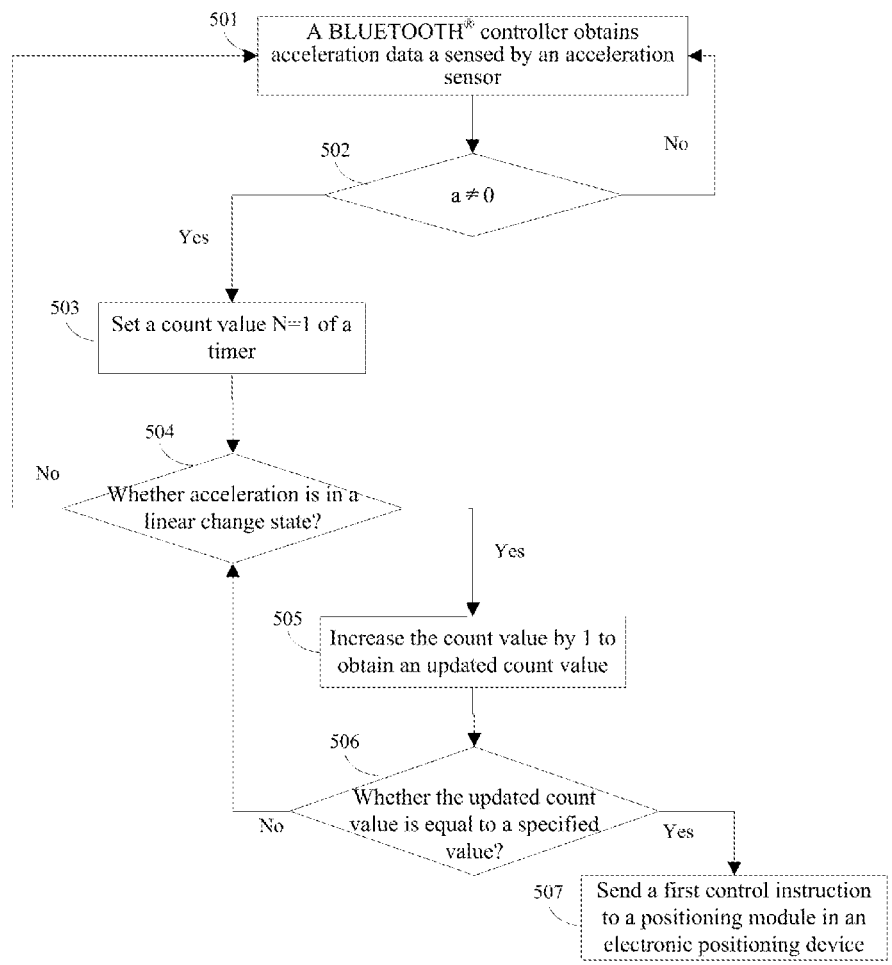
FIG. 5 is a flowchart of Embodiment 5 of a power consumption control method for an electronic positioning device according to this application.

FIG. 5 is a flowchart of Embodiment 5 of a power consumption control method for an electronic positioning device according to this application. As shown in FIG. 5, the method may include the following steps.

Step 501: A BLUETOOTH® controller obtains acceleration data a sensed by an acceleration sensor.

Step 502: Determine whether a is a non-zero value, and if yes, perform step 503; otherwise, go back to step 501.

In this step, when a is a non-zero value, it is determined that the electronic positioning device is in a moving state.

Step 503: Set a count value N=1 of a timer.

Step 504: When acceleration data subsequently sensed by the acceleration sensor is a non-zero value, each time new acceleration data sensed by the acceleration sensor is obtained, determine in real time whether acceleration of the electronic positioning device is in a linear change state, and if yes, perform step 505; otherwise, go back to step 501.

Specifically, each time the acceleration data sensed by the acceleration sensor is obtained, a first difference between a currently obtained acceleration value and a previously obtained acceleration value may be calculated, and a second difference between the previously obtained acceleration value and a pre-previously obtained acceleration value is calculated. The first difference is compared with the second difference. If the first difference is equal to the second difference, or a deviation between the first difference and the second difference is within a preset range, it may be determined that the acceleration of the electronic positioning device is in the linear change state.

Step 505: Increase the count value by 1 to obtain an updated count value.

Step 506: Determine whether the updated count value is equal to a specified value, and if yes, perform step 507; otherwise, go back to step 504.

When the updated count value is equal to the specified value, it may be determined that duration in which the acceleration of the electronic positioning device is in the linear change state reaches preset duration.

Step 507: Send a first control instruction to a positioning module in the electronic positioning device.

A manner of determining whether the acceleration of the electronic positioning device is a non-zero value and whether the duration in which the acceleration of the electronic positioning device is in the linear change state is greater than or equal to the preset duration in this embodiment is different from that in Embodiment 4. In this embodiment, it is assumed that it takes 0.5 seconds to obtain new acceleration data sensed by the acceleration sensor and determine whether there is a linear relationship between the new acceleration data and previously obtained acceleration data. If a fourth piece of obtained acceleration data no longer meets the linear relationship, go back to step 501 in a 2nd second without performing steps 505 and 506. However, in Embodiment 4, under the same assumption, if a moving state of the electronic positioning device within 3 seconds needs to be analyzed, the value of N is set to 6. That is, whether positioning is triggered can be determined only after six pieces of consecutive acceleration data are obtained and it is determined whether the six pieces of acceleration data meet the linear relationship. Because more steps are performed in Embodiment 4 than in this embodiment under the same condition, and an extra step includes data calculation, power consumption in this embodiment is reduced in comparison with Embodiment 4.

Figure 6:
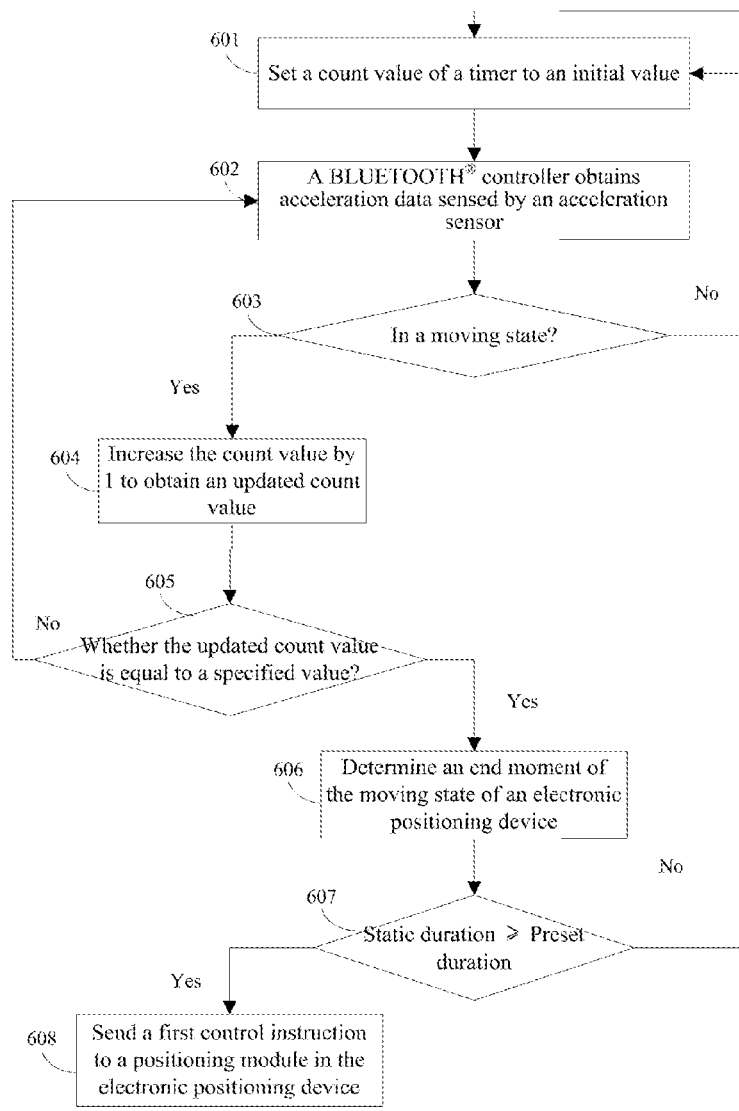
FIG. 6 is a flowchart of Embodiment 6 of a power consumption control method for an electronic positioning device according to this application.

FIG. 6 is a flowchart of Embodiment 6 of a power consumption control method for an electronic positioning device according to this application. As shown in FIG. 6, the method may include the following steps.

Step 601: Set a count value of a timer to an initial value.

Step 602: A BLUETOOTH® controller obtains acceleration data sensed by an acceleration sensor.

Step 603: Determine whether the electronic positioning device is in a moving state based on the acceleration data, and if yes, perform step 604; otherwise, go back to step 601.

Step 604: Increase the count value by 1 to obtain an updated count value.

Step 605: Determine whether the updated count value is equal to a specified value, and if yes, perform step 606; otherwise, go back to step 602.

Step 606: Determine an end moment of the moving state of the electronic positioning device.

A moment at which acceleration of the electronic positioning device is restored to zero may be determined as the end moment of the moving state of the electronic positioning device.

Step 607: Determine whether duration in which the electronic positioning device is in a static state from the end moment is greater than or equal to preset duration, and if yes, perform step 608; otherwise, go back to step 601.

The preset duration may be set as required. For example, the preset duration may be set to 5 minutes, 10 minutes, or 20 minutes.

Step 608: Send a first control instruction to a positioning module in the electronic positioning device.

In this embodiment, positioning may be triggered when the electronic positioning device is in the moving state for more than first preset duration, and duration in which the electronic positioning device switches from the moving state to the static state and is in the static state exceeds second preset duration. For example, when a user carries the electronic positioning device for running, because the user is in a moving state for a long time and a position constantly changes, it does not make much sense to locate the user while the user is in the moving state. According to the method in this embodiment, positioning may be triggered when the moving state of the user ends and the user is in a static state, so that obtained positioning information has great practical value.

Figure 7:
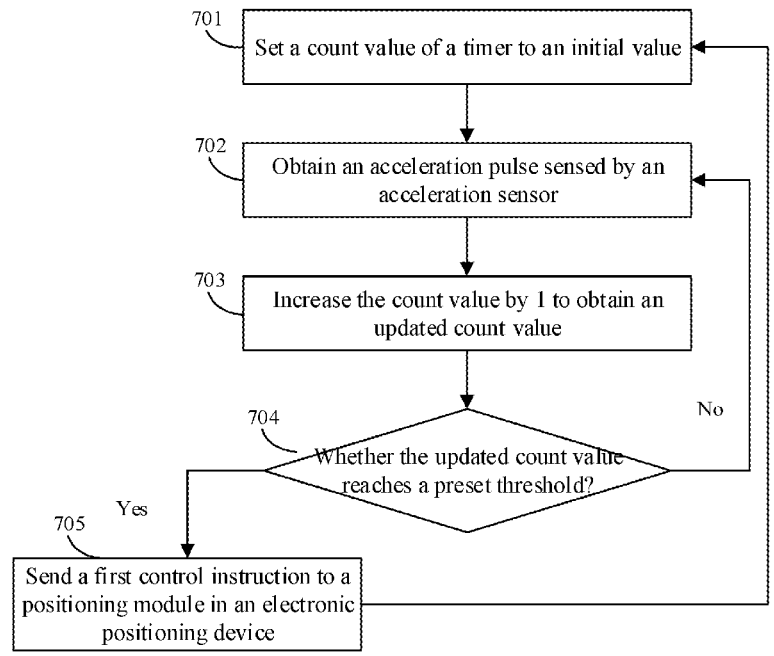
FIG. 7 is a flowchart of Embodiment 7 of a power consumption control method for an electronic positioning device according to this application.

FIG. 7 is a flowchart of Embodiment 7 of a power consumption control method for an electronic positioning device according to this application. As shown in FIG. 7, the method may include the following steps.

Step 701: Set a count value of a counter to an initial value.

Step 702: Obtain an acceleration pulse sensed by an acceleration sensor.

The acceleration pulse may be a step count pulse, that is, a pulse sensed by the acceleration sensor when a user is walking. Normally, every time the user takes a step, one pulse is generated.

Step 703: Increase the count value by 1 to obtain an updated count value.

Ideally, if the user takes N steps, the count value is N.

Step 704: Determine whether the updated count value reaches a preset threshold, and if yes, perform step 705; otherwise, go back to step 702.

The preset threshold herein may be set based on an actual requirement. A specific value of the preset threshold may be determined based on a relationship between a stride length and a moving distance of the user. For example, it is assumed that the stride length of the user is 0.5 meters. If positioning needs to be performed once every time a moving distance of the electronic positioning device reaches 100 meters, the preset threshold may be set to 200.

Step 705: Send a first control instruction to a positioning module in the electronic positioning device.

In this embodiment, after the first control instruction is sent to the positioning module in the electronic positioning device, the count value of the counter may be reset to the initial value.

In this embodiment, pulse signals sensed by the acceleration sensor are counted to determine whether the count value reaches the preset threshold, and the moving distance of the electronic positioning device may be deduced based on a quantity of steps of the user, so that positioning is triggered when the moving distance of the electronic positioning device reaches the preset threshold, thereby reducing power consumption of the electronic positioning device.

Figure 8:
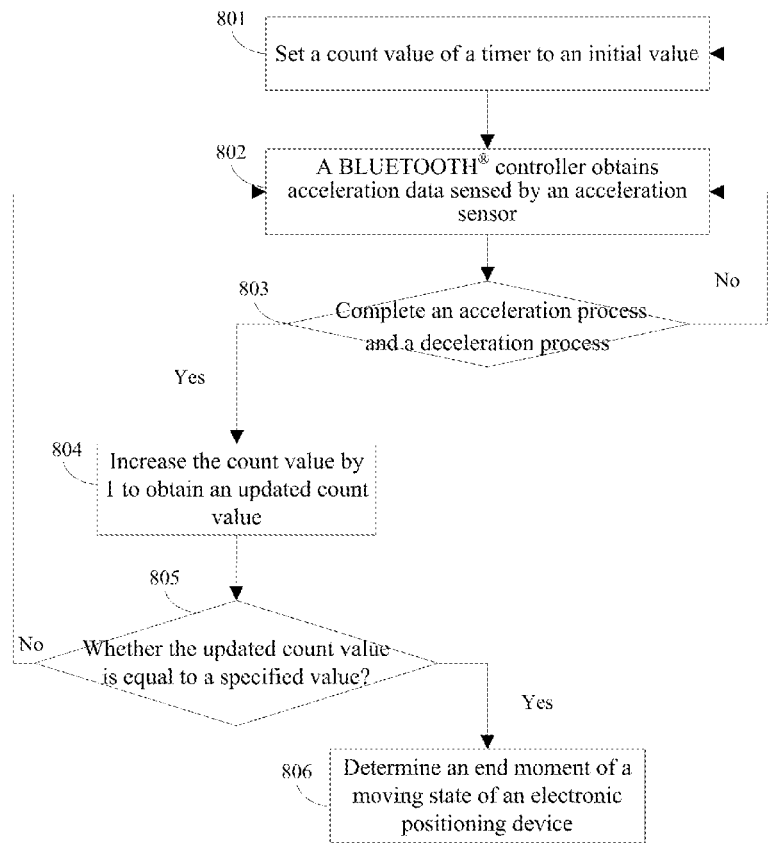
FIG. 8 is a flowchart of Embodiment 8 of a power consumption control method for an electronic positioning device according to this application.

FIG. 8 is a flowchart of Embodiment 8 of a power consumption control method for an electronic positioning device according to this application. As shown in FIG. 8, the method may include the following steps.

Step 801: Set a count value of a timer to an initial value.

Step 802: A BLUETOOTH® controller obtains acceleration data sensed by an acceleration sensor.

Step 803: Determine, based on the acceleration data, whether the electronic positioning device completes an acceleration process and a corresponding deceleration process, to obtain a third determining result, and if yes, perform step 804; otherwise, go back to step 802;

The determining whether the electronic positioning device completes an acceleration process and a corresponding deceleration process may be specifically: determining whether the electronic positioning device completes a uniform acceleration process and a corresponding uniform deceleration process. For example, the electronic positioning device is placed in a vehicle. The vehicle starts at a crossroad with a traffic light and drives to a next crossroad but stops due to a red light. In this process, the starting process of the vehicle includes a uniform acceleration process, and the stopping process includes a uniform deceleration process. The uniform acceleration process corresponds to the uniform deceleration process. Still further, to facilitate identification of the acceleration process of the vehicle starting at the crossroad, duration such as 3 to 4 seconds may be set for the acceleration process. Similarly, duration such as 3 to 4 seconds may also be set for the deceleration process.

Step 804: Increase the count value by 1 to obtain an updated count value.

Step 805: Determine whether the updated count value is equal to a specified value, and if yes, perform step 806; otherwise, go back to step 802.

Step 806: Send a first control instruction to a positioning module in the electronic positioning device.

In this embodiment, after the first control instruction is sent to the positioning module in the electronic positioning device, the count value of the counter may be reset to the initial value.

In this embodiment, an electronic positioning device in a motor vehicle on an urban road may be controlled. For example, when the specified value is 4, if the updated count value is equal to the specified value, it generally indicates that the motor vehicle has traveled through four crossroads, and a travel distance of the motor vehicle is already long. In this case, positioning may be triggered to reduce power consumption of the electronic positioning device.

It should be noted that in each embodiment of this specification, after the step of sending a first control instruction, the method may further include the following steps:

Step 1: Obtain position information output by the positioning module.

Step 2: Determine whether a position offset between the position information and position information output by the positioning module last time is greater than or equal to a preset position offset, to obtain a fourth determining result.

Step 3: Send a second control instruction when the fourth determining result indicates that the position offset is greater than or equal to the preset position offset, where the second control instruction is used to enable a positioning data sending module in the electronic positioning device such that the positioning data sending module is in an on state.

Step 4: Maintain the positioning data sending module in an off state when the fourth determining result indicates that the position offset is less than the preset position offset.

It may be specifically determined, in a plurality of manners in step 2, whether the position offset between the position information and the position information output by the positioning module last time is greater than or equal to the preset position offset. For example, a Global Positioning System (GPS) may be used as the positioning module to obtain a position coordinate of the electronic positioning device during each time of positioning. Based on a currently obtained position coordinate and a most recently obtained position coordinate, a distance between the two position coordinates may be calculated and used as the position offset. For another example, a Wi-Fi module may be used as the positioning module. Specifically, a Wi-Fi network in an ambient environment of the electronic positioning device may be scanned periodically to obtain a Wi-Fi list including one or more connectable Wi-Fi networks. A change rate of a Wi-Fi quantity in the current environment is determined based on the Wi-Fi list. It is determined whether the change rate is greater than a specified threshold, and if yes, it determined that the position offset between the position information and the position information output by the positioning module last time is greater than or equal to the preset position offset.

In the foregoing steps, the positioning data sending module in the electronic positioning device may be a module with a Wi-Fi signal receiving and sending function, or may be a module capable of receiving and sending a signal conforming to a mobile communication technology standard. The positioning data sending module is usually in the off state before the second control instruction is received. The positioning data sending module is in the on state only after the second control instruction is received. After the positioning data sending module sends current position information, the positioning data sending module may be in the off state again. Through the foregoing steps, power consumption of the positioning data sending module can be reduced, thereby further reducing power consumption of the electronic positioning device.

It should be noted that in each embodiment of this specification, before the step of sending a first control instruction, the method may further include the following steps:

Step A: Obtain information about a peripheral device that maintains a BLUETOOTH® connection with the electronic positioning device.

For example, if the electronic positioning device maintains a BLUETOOTH® connection with a smartphone, the peripheral device includes the smartphone.

Step B: Determine, based on the peripheral device information, whether the electronic positioning device is in a BLUETOOTH® connection with a target peripheral device having a positioning module, to obtain a determining result.

If the electronic positioning device is in a BLUETOOTH® connection with a plurality of peripheral devices, a peripheral device having a positioning module may be determined as the target peripheral device. For example, a smartphone having a GPS positioning module may be determined as the target peripheral device.

Step C: When the determining result indicates that the electronic positioning device is in the BLUETOOTH® connection with the target peripheral device having the positioning module, send a positioning request to the target peripheral device, and skip sending the first control instruction, where the positioning request is used to request the target peripheral device to perform positioning through the positioning module in the target peripheral device.

Step D: Send the first control instruction when the determining result indicates that the electronic positioning device is not in the BLUETOOTH® connection with the target peripheral device having the positioning module.

In the foregoing steps, when the electronic positioning device is in the BLUETOOTH® connection with the target peripheral device having the positioning module, the target peripheral device may perform positioning, and positioning information is used as position information of the electronic positioning device, thereby further reducing power consumption of the electronic positioning device. Further, because an effective distance range of the BLUETOOTH® connection is generally within 10 meters, a distance between the target peripheral device and the electronic positioning device is usually not more than 10 meters. That is, a position deviation caused by using positioning information of the target peripheral device as the position information of the electronic positioning device is acceptable.

This application further provides an electronic positioning device. The electronic positioning device includes at least a positioning module, a controller, and a sensor for sensing a physical quantity of an object's state of motion.

Figure 9:
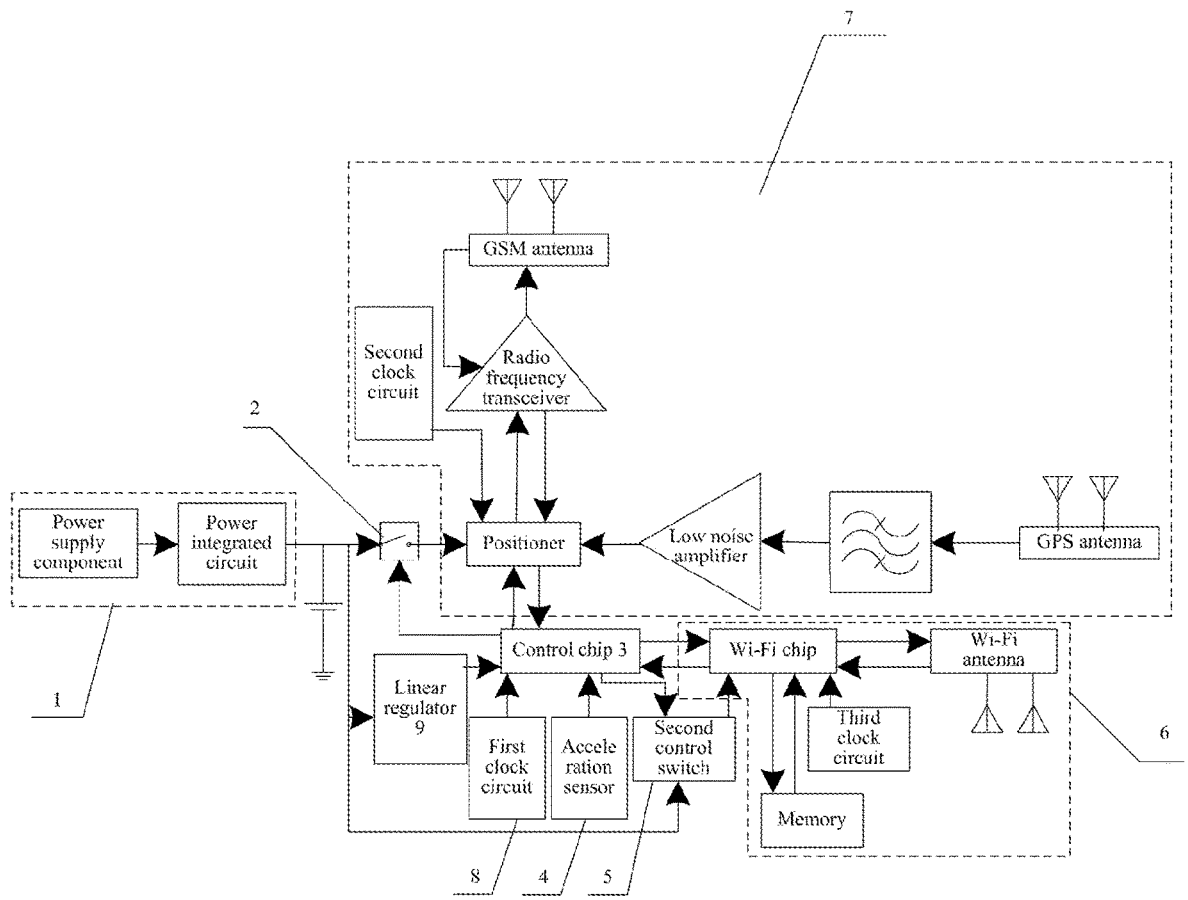
FIG. 9 is a schematic diagram of a circuit structure of an embodiment of an electronic positioning device according to this application.

FIG. 9 is a schematic diagram of a circuit structure of an embodiment of an electronic positioning device according to this application. As shown in FIG. 9, the circuit structure of the embodiment of the electronic positioning device may include a power module 1, a first control switch 2, a control chip 3, an acceleration sensor 4, a second control switch 5, a Wi-Fi circuit 6, and a positioning circuit 7.

A power output end of the power module 1 is connected to an input end of the first control switch 2, an input end of the second control switch 5, and the control chip 3, respectively. An output end of the first control switch 2 is connected to the positioning circuit 7, and an output end of the second control switch 5 is connected to the Wi-Fi circuit 6. The control chip 3 is connected to the acceleration sensor 4, a control end of the first control switch 2, and a control end of the second control switch 5, respectively. The control chip 3 controls opening and closing of the first control switch 2 and/or the second control switch 5 based on acceleration data detected by the acceleration sensor 4. The control chip 3 is further bidirectionally connected to the positioning circuit 7 and the Wi-Fi circuit 6, respectively.

A moving status of a positioner is determined based on the acceleration data detected by the acceleration sensor 4. When the acceleration data is greater than a specified threshold, it indicates that the positioner moves violently and a position deviation is large. In this case, the first control switch 2 and/or the second control switch 5 are/is controlled to be closed. The power module 1 separately supplies a working voltage to the positioning circuit 7 and/or the Wi-Fi circuit 5. The positioning circuit 7 and/or the Wi-Fi circuit 5 locate the positioner. Otherwise, the first control switch 2 and the second control switch 5 are controlled to be opened, so that the positioning circuit 7 and the Wi-Fi circuit 5 are in a sleep mode, thereby reducing power consumption.

A model of the control chip is NRF52832 and a model of the first control switch is NCP333FCT2G. The second control switch may be a linear regulator switch, and a specific model may be LP5907.

Optionally, the positioner in this application further includes a first clock circuit 8 connected to the control chip 3.

Optionally, the positioner in this application further includes a linear regulator 9 disposed between the power output end of the power module 1 and the control chip 3. A model of the linear regulator 9 may be NCP4681, and a working current is 1 µA.

The positioning circuit 7 includes the positioner, a low noise amplifier, a filter circuit, a GPS antenna, a radio frequency transceiver, and a Global System for Mobile Communications (GSM) antenna. A first input end of the positioner is connected to the output end of the first control switch, and the GPS antenna, the filter circuit, the low noise amplifier, and a second input end of the positioner are successively connected. The positioner is bidirectionally connected to the radio frequency transceiver and the control chip 3, respectively. The radio frequency transceiver is connected to a transmit end and a receive end of the GSM antenna, respectively. Specifically, the positioner and the control chip 3 are bidirectionally connected through a flat cable.

The low noise amplifier, the filter circuit, the GPS antenna, the radio frequency transceiver, and the GSM antenna are disposed to implement GPS positioning and GSM positioning. A model of the positioner may be MT2503D, and the positioner can implement dual positioning of GPS and Beidou. A model of the radio frequency transceiver may be RF7176. The GPS antenna may be a ceramic antenna.

Optionally, the positioning circuit 7 further includes a second clock circuit connected to the positioner.

The Wi-Fi circuit 6 includes a Wi-Fi chip, a Wi-Fi antenna, and a memory. The Wi-Fi chip is bidirectionally connected to the control chip 3, the Wi-Fi antenna, and the memory, respectively. Specifically, the Wi-Fi chip and the control chip 3 are bidirectionally connected through a serial port. A model of the Wi-Fi chip may be ESP8266, and the memory may be a flash card.

Optionally, the Wi-Fi circuit 6 further includes a third clock circuit connected to the Wi-Fi chip. The first clock circuit 8, the second clock circuit, and the third clock circuit enable clock signals of the entire positioner to be uniform.

The power module 1 includes a power supply component, a power integrated circuit, and a battery. The power supply component, the power integrated circuit, and the input end of the first control switch are successively connected. One end of the battery is connected between the power integrated circuit and the input end of the first control switch, and the other end is grounded. The power supply component may be a Universal Serial Bus (USB) interface or a direct current (DC) power supply.

The control chip 3 stores a program and is configured to perform the following steps:

obtaining sensing data of an acceleration sensor;

determining, based on the sensing data, whether a current condition meets a preset trigger condition, to obtain a first determining result;

sending a first control instruction when the first determining result indicates that the current condition meets the preset trigger condition, where the first control instruction is used to enable the positioner in the electronic positioning device such that the positioner is in an on state; and maintaining the positioner in an off state when the first determining result indicates that the current condition does not meet the preset trigger condition.

Optionally, the determining, based on the sensing data, whether a current condition meets a preset trigger condition may specifically include:

determining, based on the sensing data, whether duration in which the electronic positioning device is in a static state is greater than or equal to first preset duration.

Optionally, after the sending a first control instruction, the method further includes:

obtaining position information output by the positioner;

determining whether a position offset between the position information and position information output by the positioner last time is greater than or equal to a preset position offset, to obtain a second determining result;

sending a second control instruction when the second determining result indicates that the position offset is greater than or equal to the preset position offset, where the second control instruction is used to enable a positioning data sending module (the Wi-Fi circuit 6) in the electronic positioning device such that the positioning data sending module is in an on state; and maintaining the positioning data sending module in an off state when the second determining result indicates that the position offset is less than the preset position offset.

Optionally, before the sending a first control instruction, the method further includes:

obtaining information about a peripheral device that maintains a BLUETOOTH® connection with the electronic positioning device;

determining, based on the peripheral device information, whether the electronic positioning device is in a BLUETOOTH® connection with a target peripheral device having a positioning module, to obtain a third determining result;

when the third determining result indicates that the electronic positioning device is in the BLUETOOTH® connection with the target peripheral device having the positioning module, sending a positioning request to the target peripheral device, and skipping sending the first control instruction, where the positioning request is used to request the target peripheral device to perform positioning through the positioning module in the target peripheral device; and sending the first control instruction when the third determining result indicates that the electronic positioning device is not in the BLUETOOTH® connection with the target peripheral device having the positioning module.

This application further provides a power consumption control system for an electronic positioning device.

Figure 10:
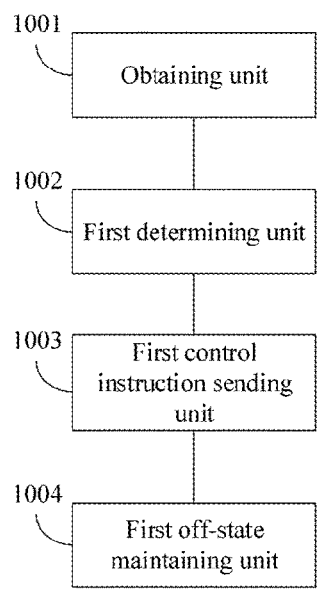
FIG. 10 is a structural diagram of an embodiment of a power consumption control system for an electronic positioning device according to this application.

FIG. 10 is a structural diagram of an embodiment of a power consumption control system for an electronic positioning device according to this application. As shown in FIG. 10, the system includes:

an obtaining unit 1001, configured to obtain sensing data of a sensor for sensing a physical quantity of an object's state of motion;

a first determining unit 1002, configured to determine, based on the sensing data, whether a current condition meets a preset trigger condition, to obtain a first determining result;

a first control instruction sending unit 1003, configured to send a first control instruction when the first determining result indicates that the current condition meets the preset trigger condition, where the first control instruction is used to enable a positioning module in the electronic positioning device such that the positioning module is in an on state; and a first off-state maintaining unit 1004, configured to maintain the positioning module in an off state when the first determining result indicates that the current condition does not meet the preset trigger condition.

Optionally, the first determining unit 1002 specifically includes:

a first determining subunit, configured to determine, based on the sensing data, whether duration in which the electronic positioning device is in a static state is greater than or equal to first preset duration.

Optionally, the system further includes:

a position information obtaining unit, configured to: after the first control instruction is sent, obtain position information output by the positioning module;

a second determining unit, configured to determine whether a position offset between the position information and position information output by the positioning module last time is greater than or equal to a preset position offset, to obtain a second determining result;

a second control instruction sending unit, configured to send a second control instruction when the second determining result indicates that the position offset is greater than or equal to the preset position offset, where the second control instruction is used to enable a positioning data sending module in the electronic positioning device such that the positioning data sending module is in an on state; and a second off-state maintaining unit, configured to maintain the positioning data sending module in an off state when the second determining result indicates that the position offset is less than the preset position offset.

Optionally, the system further includes:

a peripheral device information obtaining unit, configured to: before the first control instruction is sent, obtain information about a peripheral device that maintains a BLUETOOTH® connection with the electronic positioning device;

a third determining unit, configured to determine, based on the peripheral device information, whether the electronic positioning device is in a BLUETOOTH® connection with a target peripheral device having a positioning module, to obtain a third determining result; and a positioning request sending unit, configured to: when the third determining result indicates that the electronic positioning device is in the BLUETOOTH® connection with the target peripheral device having the positioning module, send a positioning request to the target peripheral device, and skip sending the first control instruction, where the positioning request is used to request the target peripheral device to perform positioning through the positioning module in the target peripheral device, where the first control instruction sending unit is specifically configured to send the first control instruction when the third determining result indicates that the electronic positioning device is not in the BLUETOOTH® connection with the target peripheral device having the positioning module.

In this application, the positioning data sending module may be used to transmit positioning data of the electronic positioning device to an external device. The positioning data sending module may be a communications module adopting a second generation (2G) mobile communication technology, a third generation (3G) mobile communication technology, a fourth generation (4G) mobile communication technology, a fifth generation (5G) mobile communication technology, a cellular-based Narrowband Internet of Things (NB-IoT) technology, an enhanced Machine Type Communication (eMTC) technology, a Long Range (LoRa) technology, or a sigfox technology.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

In this paper, several examples are used for illustration of the principles and implementations of this application. The description of the foregoing embodiments is used to help illustrate the method of this application and the core principles thereof. In addition, those of ordinary skill in the art can make various modifications in terms of specific implementations and scope of application in accordance with the teachings of this application. In conclusion, the content of the present specification shall not be construed as a limitation to this application.

The embodiments of this application are described in detail above with reference to the accompanying drawings, but this application is not limited to the above embodiments.

Within the knowledge of a person of ordinary skill in the art, various variations can also be made without departing from the spirit of this application.

What is claimed is:

1. A power consumption control method for an electronic positioning device, comprising:
   obtaining sensing data of a sensor for sensing a physical quantity of an object's state of motion;
   determining, based on the sensing data, whether a current condition meets a preset trigger condition, to obtain a first determining result;
   sending a first control instruction when the first determining result indicates that the current condition meets the preset trigger condition, wherein the first control instruction is used to enable a positioning module in the electronic positioning device such that the positioning module is in an on state; and
   maintaining the positioning module in an off state when the first determining result indicates that the current condition does not meet the preset trigger condition;
   wherein after sending the first control instruction, the method further comprises:
   obtaining current position information of the electronic positioning device output by the positioning module;
   determining whether a position offset between the current position information of the electronic positioning device and previous position information of the electronic positioning device output by the positioning module is greater than or equal to a preset position offset, to obtain a fourth determining result;
   sending a second control instruction when the fourth determining result indicates that the position offset is greater than or equal to the preset position offset, wherein the second control instruction is used to enable a positioning data sending module in the electronic positioning device such that the positioning data sending module is in an on state; and
   maintaining the positioning data sending module in an off state when the fourth determining result indicates that the position offset is less than the preset position offset.

2. The method according to claim 1, wherein the obtaining sensing data of a sensor for sensing a physical quantity of an object's state of motion specifically comprises:
   obtaining acceleration data sensed by an acceleration sensor.

3. The method according to claim 2, wherein the determining, based on the sensing data, whether a current condition meets a preset trigger condition specifically comprises:
   determining, based on the acceleration data, whether duration in which the electronic positioning device is in a moving state from a first moment is greater than or equal to fourth preset duration, to obtain a second determining result;
   when the second determining result is yes, determining an end moment of the moving state of the electronic positioning device; and
   determining whether duration in which the electronic positioning device is in a static state from the end moment is greater than or equal to fifth preset duration.

4. The method according to claim 2, wherein the determining, based on the sensing data, whether a current condition meets a preset trigger condition specifically comprises:
   determining, based on the acceleration data, whether a moving distance of the electronic positioning device is greater than or equal to a preset distance.

5. The method according to claim 4, wherein the determining whether a moving distance of the electronic positioning device is greater than or equal to a preset distance specifically comprises:
   determining whether a quantity of pulses sensed by the acceleration sensor is greater than or equal to a first preset threshold.

6. The method according to claim 2, wherein the determining, based on the sensing data, whether a current condition meets a preset trigger condition specifically comprises:
   determining, based on the acceleration data, whether the electronic positioning device completes an acceleration process and a corresponding deceleration process, to obtain a third determining result;
   increasing a count value by 1 when the third determining result is yes, wherein an initial value of the count value is 0; and
   determining whether the count value is greater than a second preset threshold.

7. The method according to claim 1, wherein the determining, based on the sensing data, whether a current condition meets a preset trigger condition specifically comprises:
   determining, based on the sensing data, whether duration in which the electronic positioning device is in a static state is greater than or equal to first preset duration.

8. The method according to claim 1, wherein the determining, based on the sensing data, whether a current condition meets a preset trigger condition specifically comprises:
   determining, based on the sensing data, whether duration in which the electronic positioning device is in a static state is greater than or equal to second preset duration, and switching from the static state to a moving state after the second preset duration.

9. The method according to claim 1, wherein the determining, based on the sensing data, whether a current condition meets a preset trigger condition specifically comprises:
   determining, based on the sensing data, whether duration in which the electronic positioning device is in a moving state is greater than or equal to third preset duration.

10. The method according to claim 9, wherein the determining whether duration in which the electronic positioning device is in a moving state is greater than or equal to third preset duration specifically comprises:
    determining whether acceleration of the electronic positioning device is a non-zero value and whether duration in which the acceleration of the electronic positioning device is in a linear change state is greater than or equal to the third preset duration.

11. The method according to claim 1, wherein before the sending a first control instruction, the method further comprises:
    obtaining information about a peripheral device that maintains a BLUETOOTH® connection with the electronic positioning device;
    determining, based on the peripheral device information, whether the electronic positioning device is in the BLUETOOTH® connection with a target peripheral device having a positioning module, to obtain a fifth determining result;
    when the fifth determining result indicates that the electronic positioning device is in the BLUETOOTH® connection with the target peripheral device having the positioning module, sending a positioning request to the target peripheral device, and skipping sending the first control instruction, wherein the positioning request is used to request the target peripheral device to perform positioning through the positioning module in the target peripheral device; and sending the first control instruction when the fifth determining result indicates that the electronic positioning device is not in the BLUETOOTH® connection with the target peripheral device having the positioning module.

12. An electronic positioning device, wherein the electronic positioning device comprises a positioning module, a controller, and a sensor for sensing a physical quantity of an object's state of motion, and the controller stores a program and is configured to perform the following steps:

obtaining sensing data of the sensor;

determining, based on the sensing data, whether a current condition meets a preset trigger condition, to obtain a first determining result;

sending a first control instruction when the first determining result indicates that the current condition meets the preset trigger condition, wherein the first control instruction is used to enable a positioning module in the electronic positioning device such that the positioning module is in an on state; and maintaining the positioning module in an off state when the first determining result indicates that the current condition does not meet the preset trigger condition;

wherein after sending the first control instruction, the following steps are further performed:

obtaining current position information of the electronic positioning device output by the positioning module;

determining whether a position offset between the current position information of the electronic positioning device and previous position information of the electronic positioning device output by the positioning module is greater than or equal to a preset position offset, to obtain a second determining result;

sending a second control instruction when the second determining result indicates that the position offset is greater than or equal to the preset position offset, wherein the second control instruction is used to enable a positioning data sending module in the electronic positioning device such that the positioning data sending module is in an on state; and maintaining the positioning data sending module in an off state when the second determining result indicates that the position offset is less than the preset position offset.

13. The electronic positioning device according to claim 12, wherein the determining, based on the sensing data, whether a current condition meets a preset trigger condition specifically comprises:

determining, based on the sensing data, whether duration in which the electronic positioning device is in a static state is greater than or equal to first preset duration.

14. The electronic positioning device according to claim 12, wherein before the sending a first control instruction, the following steps are further performed:

obtaining information about a peripheral device that maintains a BLUETOOTH® connection with the electronic positioning device;

determining, based on the peripheral device information, whether the electronic positioning device is in the BLUETOOTH® connection with a target peripheral device having a positioning module, to obtain a third determining result;

when the third determining result indicates that the electronic positioning device is in the BLUETOOTH® connection with the target peripheral device having the positioning module, sending a positioning request to the target peripheral device, and skipping sending the first control instruction, wherein the positioning request is used to request the target peripheral device to perform positioning through the positioning module in the target peripheral device; and sending the first control instruction when the third determining result indicates that the electronic positioning device is not in the BLUETOOTH® connection with the target peripheral device having the positioning module.

15. A power consumption control system for an electronic positioning device, comprising a controller, wherein the controller is configured to:

obtain sensing data of a sensor for sensing a physical quantity of an object's state of motion;

determine, based on the sensing data, whether a current condition meets a preset trigger condition, to obtain a first determining result;

send a first control instruction when the first determining result indicates that the current condition meets the preset trigger condition, wherein the first control instruction is used to enable a positioning module in the electronic positioning device such that the positioning module is in an on state; and maintain the positioning module in an off state when the first determining result indicates that the current condition does not meet the preset trigger condition;

wherein after sending the first control instruction, the controller is further configured to:

obtain current position information of the electronic positioning device output by the positioning module;

determine whether a position offset between the current position information of the electronic positioning device and previous position information of the electronic positioning device output by the positioning module is greater than or equal to a preset position offset, to obtain a second determining result;

send a second control instruction when the second determining result indicates that the position offset is greater than or equal to the preset position offset, wherein the second control instruction is used to enable a positioning data sending module in the electronic positioning device such that the positioning data sending module is in an on state; and maintain the positioning data sending module in an off state when the second determining result indicates that the position offset is less than the preset position offset.

16. The system according to claim 15, wherein the controller is further configured to:

determine, based on the sensing data, whether duration in which the electronic positioning device is in a static state is greater than or equal to first preset duration.

17. The system according to claim 15, wherein the controller is further configured to:

before the first control instruction is sent, obtain information about a peripheral device that maintains a BLUETOOTH® connection with the electronic positioning device;

determine, based on the peripheral device information, whether the electronic positioning device is in the BLUETOOTH® connection with a target peripheral device having a positioning module, to obtain a third determining result;

when the third determining result indicates that the electronic positioning device is in the BLUETOOTH® connection with the target peripheral device having the positioning module, send a positioning request to the target peripheral device, and skip sending the first control instruction, wherein the positioning request is used to request the target peripheral device to perform positioning through the positioning module in the target peripheral device, and send the first control instruction when the third determining result indicates that the electronic positioning device is not in the BLUETOOTH® connection with the target peripheral device having the positioning module.

* * * * *